United States Patent
Kountouris et al.

(10) Patent No.: US 9,247,430 B2
(45) Date of Patent: Jan. 26, 2016

(54) METHOD OF PROCESSING A DATA PACKET ON TRANSMISSION, A METHOD OF PROCESSING A DATA PACKET ON RECEPTION, AND ASSOCIATED DEVICES AND NODES

(75) Inventors: Apostolos Kountouris, Grenoble (FR); Dominique Barthel, Bernin (FR); Michael Dohler, Barcelona (ES); Andrea Bartoli, Barcelona (ES); Juan Hernandez Serrano, Barcelona (ES); Miguel Soriano, Barcelona (ES)

(73) Assignee: Orange, Paris (FR)

( * ) Notice: Subject to any disclaimer, the term of this patent is extended or adjusted under 35 U.S.C. 154(b) by 0 days.

(21) Appl. No.: 14/127,123

(22) PCT Filed: Jun. 15, 2012

(86) PCT No.: PCT/FR2012/051352
§ 371 (c)(1),
(2), (4) Date: Dec. 17, 2013

(87) PCT Pub. No.: WO2012/172267
PCT Pub. Date: Dec. 20, 2012

(65) Prior Publication Data
US 2014/0137210 A1    May 15, 2014

(30) Foreign Application Priority Data
Jun. 17, 2011   (FR) .................................. 11 55328

(51) Int. Cl.
G06F 7/04 (2006.01)
H04W 12/06 (2009.01)
H04W 12/12 (2009.01)

(52) U.S. Cl.
CPC .............. *H04W 12/06* (2013.01); *H04W 12/12* (2013.01)

(58) Field of Classification Search
None
See application file for complete search history.

(56) References Cited

U.S. PATENT DOCUMENTS 6,229,806 B1    5/2001   Lockhart et al.
2004/0259529 A1*  12/2004   Suzuki .......................... 455/411

OTHER PUBLICATIONS

Andrea Bartoli et al., "Low-Power Low-Rate Goes Long-Range: THe Case for Secure and Cooperative Machine-to-Machine Communications", May 13, 2011, Networking 2011 Workshops, Springer Berlin Heidelberg, Berlin, Heidelberg, pp. 219-230, XP019163032.

(Continued)

*Primary Examiner* — Brandon Hoffman
(74) *Attorney, Agent, or Firm* — David D. Brush; Westman Champlin & Koehler, P.A.

(57) ABSTRACT

A method is provided for processing a data packet on reception, where the data packet is transmitted by a first node to a second node over a link of a wireless electronic communications network. The packet includes a header and payload data. The method includes a step of receiving the data packet in two stages, a first stage of receiving the header and a second stage of receiving the payload data. The first stage includes the following steps performed by the second node on receiving a header of the data packet: detecting in the received preamble an authentication preamble for authenticating the link; using the data packet authentication preamble to authenticate the link; and in the event of the authentication having a positive result, deciding to trigger the second stage of receiving the payload data from the data packet.

12 Claims, 4 Drawing Sheets

(56) References Cited

OTHER PUBLICATIONS

International Search Report and Written Opinion dated Oct. 1, 2012 for corresponding International Application No. PCT/FR2012/051352, filed Jun. 15, 2012.

English translation of the Written Opinion dated Oct. 1, 2012 for corresponding International Application No. PCT/FR2012/051352, filed Jun. 15, 2012.

* cited by examiner

METHOD OF PROCESSING A DATA PACKET ON TRANSMISSION, A METHOD OF PROCESSING A DATA PACKET ON RECEPTION, AND ASSOCIATED DEVICES AND NODES

CROSS-REFERENCE TO RELATED APPLICATIONS

This Application is a Section 371 National Stage Application of International Application No. PCT/FR2012/051352, filed Jun. 15, 2012, which is incorporated by reference in its entirety and published as WO 2012/172267 A1 on Dec. 20, 2012, not in English.

1. FIELD OF THE INVENTION

The field of the invention is that of telecommunications, and more particularly making telecommunications secure in a wireless electronic communications network.

The present invention relates to a method of processing a data packet on reception, by a node of said wireless communications network.

The present invention also relates to a method of processing a data packet on transmission, by a node of said wireless communications network.

The present invention also relates to a device for transmitting such a packet over such a link. The invention also relates to a device for receiving such a packet.

The invention applies advantageously to networks of sensors in which the sensors are battery-powered and are subjected to severe energy constraints.

Such low-power sensors have a lifetime that may be several years to several tens of years. This lifetime is correspondingly lengthened if they are temporarily switched off (i.e. subjected to duty cycling). Duty cycling makes it possible to ensure that any operations that require large amounts of energy are minimized.

Packets received by a receiver node need not be specifically for that node. Packets that are not specifically for that node may be legitimate or they may be malicious. Typically, packets that are not for that node are received in full and are then discarded by the upper layers, e.g. because of a mismatch in a MAC address or in an IP address.

2. DRAWBACKS OF THE PRIOR ART

The energy expended by the receiving node for processing packets that are to be discarded is far from being negligible. Packets that are not for that node but that are legitimate, referred to below as "non-pertinent packets" arrive at a more or less regular rate that depends on the number of nodes in the neighborhood and on the transmission rates of neighboring nodes. These non-pertinent packets generally come from neighboring nodes that are within one hop from the receiving node. They may equally well be data packets or control packets. Typically, energy is expended on receiving the packet in full, performing security procedures on the entire packet, and verifying its destination address. It is only after those various operations have been performed that the packet is discarded.

Examples of non-pertinent packets include unicast data packets for nodes other than the current node, packets that are broadcast redundantly, hand-shaking packets, or indeed control packets used in the context of random access control procedures.

Filtering non-pertinent packets can be avoided with the help of filtering using the destination address of the packet. It is also possible to program the communications link in such a manner that the transmitter and the receiver wake up at specific instants that are determined a priori. It is also known to make use of short preambles containing the appropriate information relating to the destination of a packet so as to enable receiver nodes that are not destinations of the packet in question to go back to sleep before the long data packet reaches them.

Nevertheless, none of those techniques makes it possible to avoid overhearing. They do no more than provide for specific processing in addition to the processing needed for receiving a packet that is accessible to the node by radio.

It is also possible for packets to be malicious and used to run denial of service (DoS) attacks for the purpose of seeking to make a node or a link unavailable. Typical attacks against low-power networks are exhaustion attacks that seek to discharge the battery of a node. In order to combat attacks of that type, various solutions have been deployed.

One example of a DoS attack makes use of the bidirectional request-to-send/clear-to-send (RTS/CTS) hand-shaking mechanism used by numerous medium access control (MAC) layer protocols for handling the problem of hidden nodes. An attacker can exhaust the resources of a node by repeatedly sending RTS messages in order to trigger CTS replies from a target neighboring node. Restrictive authentication at link layer level makes it possible to prevent such attacks from succeeding. Nevertheless, the node that receives the RTS messages still consumes energy and bandwidth.

Another DoS attack consists in injecting in appropriate traffic into the network. An attacker can send a packet into the network solely for the purpose of causing the nodes that are involved with routing the packet to its destination to consume energy.

As mentioned above, the response traditionally used against that type of attack consists in reinforcing packet authentication at the link layer level in order to limit the rate at which packets are admitted by the MAC layer by giving a node access to the channel for a short time interval only. Another solution relies on a trust framework where collaborative action is taken to detect traffic models that are abnormal for certain nodes.

Nevertheless, those techniques do not provide sufficient security because they fail in effectively preventing DoS attacks. Finally, a node is caused to process a non-negligible number of malicious packets.

There therefore exists a need for a solution that is effective in combating denial of service attacks while avoiding putting a node into an overhearing situation.

3. SUMMARY OF THE INVENTION

The invention seeks to improve the situation by providing a processing method for processing a data packet on reception, said data packet being transmitted by a first node to a second node over a link of a wireless electronic communications network, said packet comprising a header and payload data. According to the invention, the method comprises a step of receiving the data packet in two stages, a first stage of receiving the header and a second stage of receiving the payload data, the first stage comprising the following steps performed by the second node on receiving a header of said data packet:

detecting in the received header an authentication preamble for authenticating the link;
  using the data packet authentication preamble to authenticate the link; and in the event of the authentication having a positive result, deciding to trigger the second stage of receiving the payload data from the data packet.

Inserting a preamble in the header of the data packet for authenticating the link between the transmitter node and the receiver node enables the link to be authenticated on the basis of the second node receiving no more than the header of the data packet.

Data packet reception thus takes place in two stages: firstly reception of the header of the packet including the authentication of the link, and then if the link authentication step is successful, a stage of receiving the payload data of the packet.

Thus, the second node can take a decision to continue receiving the data packet if the step of authenticating the link is successful, or on the contrary in the event of authentication of the link failing it can decide to interrupt receiving the data packet and to discard it. Under such circumstances, the data packet is thus discarded even before the payload data has been received.

In the invention and unlike the prior art, it is thus possible for the second node to authenticate a data packet without receiving it in full.

Performing authentication on the basis of the header alone goes against the present practice of the person skilled in the art. It is generally accepted that authentication relies in particular on performing a checksum type calculation, which requires a packet to be received in full before it can be authenticated.

The invention thus proposes an approach that is novel and inventive, being based on authenticating the link between two nodes rather than authenticating the packet itself. This approach presents the advantage of minimizing the energy expended by the second node in order to process the packets it receives. It thus disarms denial of service attacks without putting the node in an overhearing situation, by devoting few resources to discarding malicious packets.

An advantage of the invention is that it also makes it possible to process non-pertinent packets at reduced cost.

According to an aspect of the invention, the detected authentication preamble has a value that is a function of at least one attribute shared by the first and second nodes, the authentication step includes the following substeps of:
  comparing the detected authentication preamble with a reference authentication preamble generated as a function of said at least one attribute; and
  taking a decision as a function of the result of the comparison.

Sharing knowledge about the value of at least one attribute of the link and using that knowledge to calculate the authentication preamble makes authentication more reliable.

In another aspect, the method of the invention includes a prior step of generating at least one reference authentication preamble for the link with a first node on the basis of at least one attribute shared with the first node, and a step of storing said at least one generated reference authentication preamble in memory.

Acting beforehand to calculate one or more reference authentication preamble values for the link in question makes it possible to limit the time required by the node for analyzing the preamble of the packet on reception.

In yet another aspect of the invention, at least one attribute belongs to the group comprising:
  a link identification attribute;
  a link authentication attribute; and
  a data packet freshness attribute.

The sharing of such attributes by transmitter and receiver nodes makes it possible to authenticate reliably both the link and the data packet.

According to yet another aspect of the invention, the step of generating a reference authentication preamble is performed on the basis of an identification attribute {IDu, IDv}, an authentication attribute K(u,v), and a freshness attribute $\underline{i}$ and on the basis of a message code H(k,m) that is a function of data $\underline{m}$ and a key $\underline{k}$, using the following equation:

$$F_i^{u \rightarrow v} |_{K_{u-v}} = \begin{cases} H(\{ID_u, ID_v\}, K_{u-v}) & \text{for } i = 0 \\ H(F_{i-1}^{u \rightarrow v} |_{K_{u-v}}, K_{u-v}) & \text{for } i \neq 0 \end{cases}$$

where $\underline{i}$, $\underline{k}$, and $\underline{m}$ are non-zero integers.

An advantage of this step of generating a preamble is that it makes it possible to calculate the authentication preamble of the current packet iteratively on the basis of the preamble for the preceding packet.

The invention also provides a processing method for processing a data packet for transmission by a first node of a wireless electronic communications network, said data packet being for transmitting to a second node over a link of the wireless electronic communications network, said data packet having a header and payload data.

According to the invention, said method comprises a step of inserting a link authentication preamble in the header of the data packet.

In an aspect of the invention, when the header of the data packet comprises at least one physical layer header followed by a MAC layer header, the authentication preamble is inserted in the header of the data packet in a position selected from the group comprising the following positions:
  at the end of the physical layer header;
  in the physical layer preamble, between an end of frame field and a frame length field;
  in the physical layer header, after a synch preamble;
  in the physical layer header, instead of the synch preamble;
  in the physical layer header, instead of the start of frame field; and
  in the MAC layer header, after a frame control field.

The authentication preamble that is generated may be inserted in various locations in the header of the packet. Advantageously, it is inserted at the beginning of the header, so as to enable the packet authentication step of the invention to be triggered as soon as possible.

Thus, the processing method of the invention makes it possible to decide on what further action to perform on receiving a data packet as soon as the low levels of the open systems interconnection (OSI) model have been received.

The invention also provides a device for processing a data packet on reception and suitable for performing the above-described method of the invention for processing on transmission. Such a device may advantageously be incorporated in a node of a wireless electronic communications network.

The invention also provides a device for processing a data packet on transmission suitable for performing the above-described method of the invention for processing on transmission. Such a device may advantageously be incorporated in a node of a wireless electronic communications network.

The invention also provides a node including a device of the invention for transmitting a data packet and a device of the invention for receiving a data packet.

The invention also provides a wireless electronic communications network having a plurality of nodes of the invention.

The invention also provides a computer program including instructions for performing a method as described above for processing on reception when the program is executed by a processor. Such a program may use any programming language. It may be downloaded from a communications network and/or it may be stored on a computer-readable medium.

Finally, the invention provides a computer program including instructions for performing a method as described above for processing on transmission when the program is executed by a processor. Such a program may use any programming language. It may be downloaded from a communications network and/or it may be recorded on a computer-readable medium.

4. LIST OF FIGURES

Other advantages and characteristics of the invention appear more clearly on reading the following description of a particular implementation of the invention given by way of non-limiting illustrative example, and with reference to the accompanying drawings, in which.

5. DESCRIPTION OF A PARTICULAR IMPLEMENTATION OF THE INVENTION

The general principle of the invention relies on inserting an authentication preamble in the header of a data packet before it is transmitted over a link between a first node and a second node connected to an electronic communications network. Such a preamble is shared between the first and second nodes. It is used by the second node for authenticating the link on the basis of reading only the header of the data packet and for deciding whether it can safely receive the entire data packet.

Figure 1:
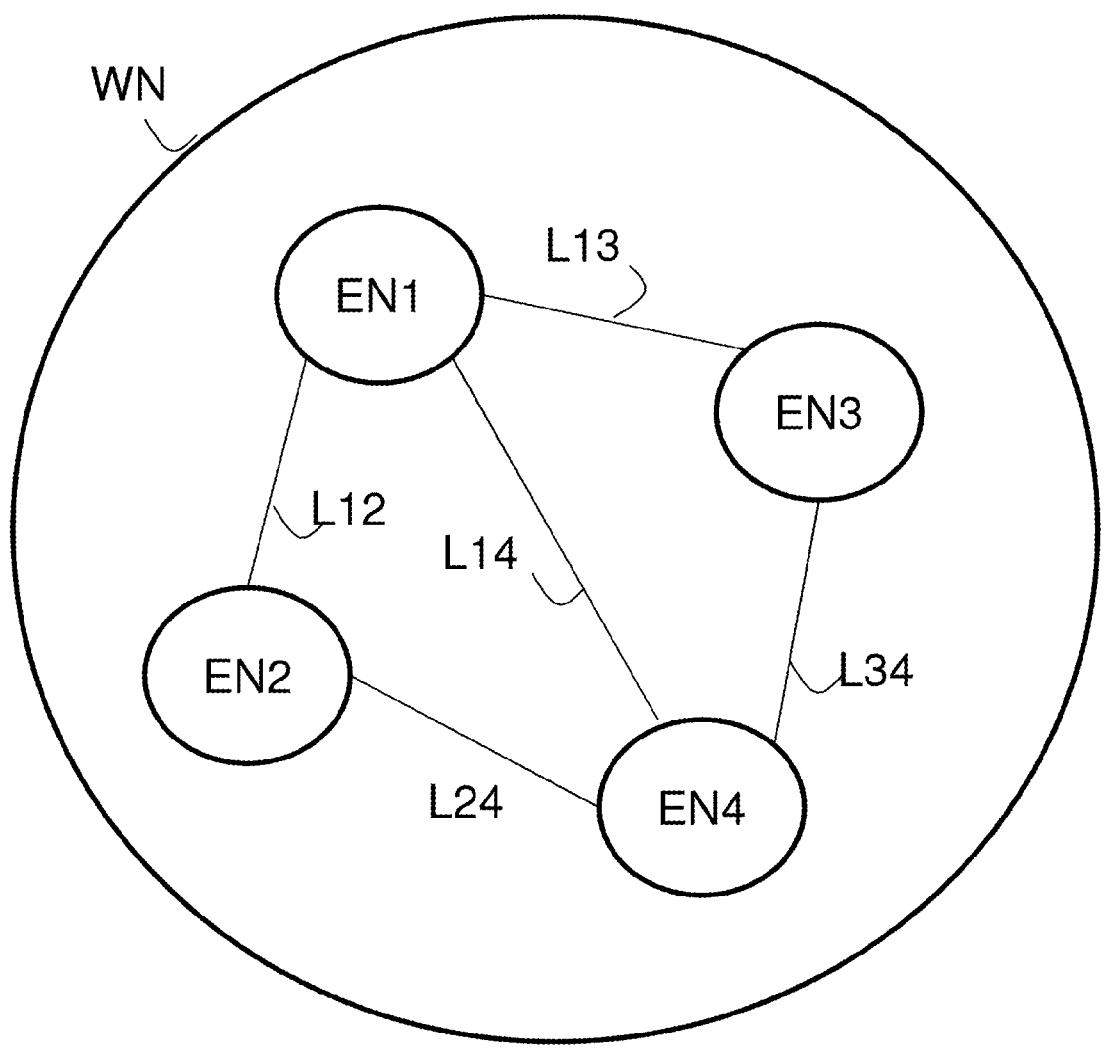
FIG. 1 is a diagram of an electronic communications network having nodes of the invention connected thereto.

With reference to FIG. 1, consideration is given to an electronic communications network WN having a plurality of nodes connected thereto by wireless links. By way of example, it may be cellular communications network of the GSM or subsequent generation type or it may be a network of sensors. In a cellular network the nodes are mobile telephones. In a network of sensors, the nodes are sensors, preferably on board vehicles or battery-powered, and therefore subjected to severe energy constraints.

FIG. 1 is a diagram showing four nodes EN1 to EN4 connected to one another by wireless links L12, L13, L14, L24, and L34. The node EN1 is in the direct neighborhood of the other three nodes EN2, EN3, and EN4. When one of the nodes in this neighborhood, e.g. the node EN2, sends a message by radio to another node in the same neighborhood, e.g. EN4, then the node EN1 is in a situation to hear the message even though it is not the destination of that message. It can thus be understood that depending on the number of nodes in the surrounding neighborhood and on the amount of traffic in the neighborhood, a node may be subjected to a high level of overhearing.

Figure 2:
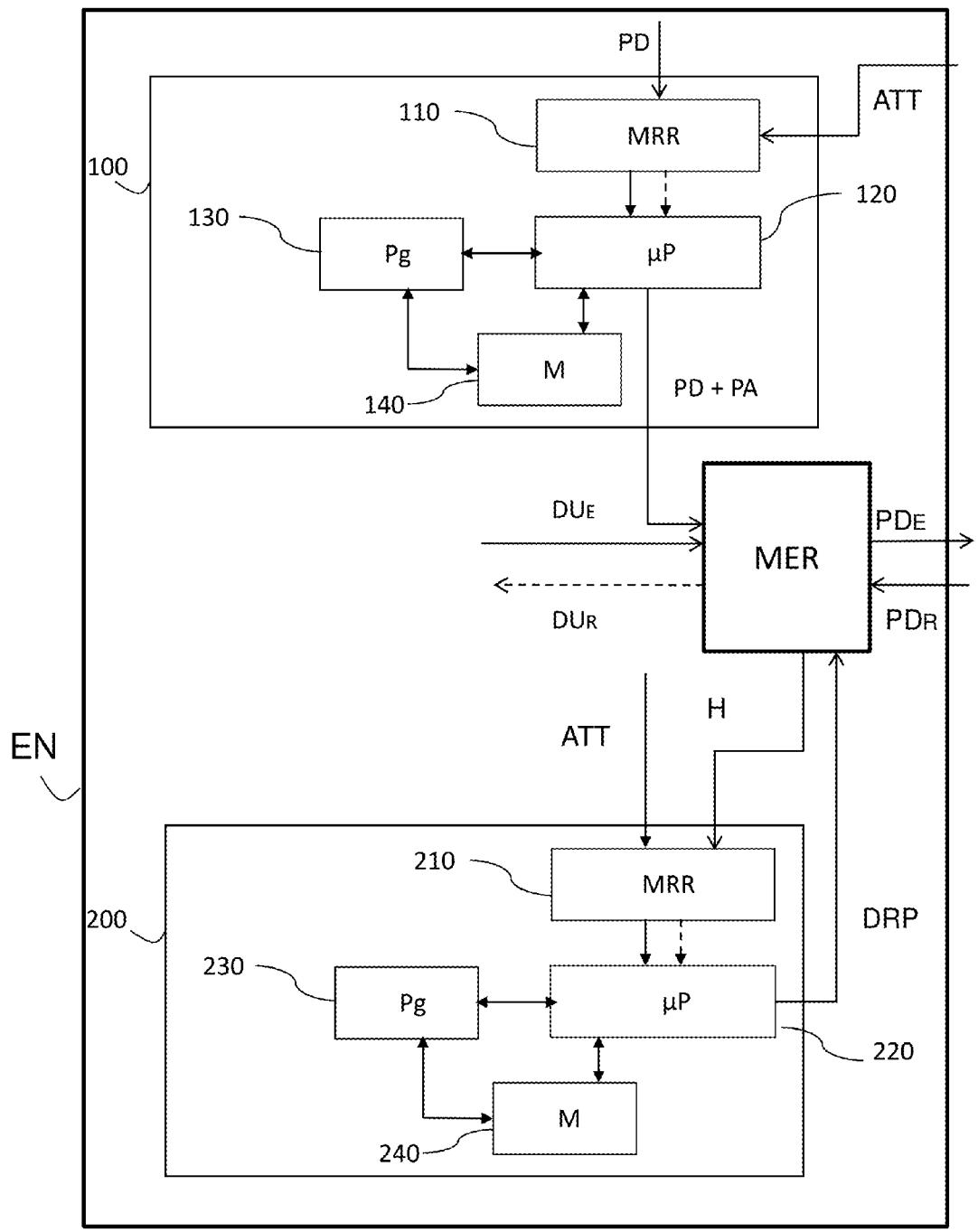
FIG. 2 is a diagram of the structure of a node of the invention.

FIG. 2 shows the structure of a node EN of the invention.

In a first aspect of the invention, the node EN has a device 100 for processing a data packet prior to transmitting it over a link between the node and another node of the network.

The processor device 100 of the invention comprises a receiver module 110 suitable for receiving a data packet PD including payload data DU that the node EN seeks to transmit to other nodes of the network WN. The packet is processed by a processor unit 120 having a microprocessor suitable for implementing the means making up the invention, and in particular means for calculating and inserting a link authentication preamble PA in the header of the data packet PD to be transmitted. In a particular implementation of the invention, the calculation means are suitable for taking account of at least one attribute ATT of the link between EN and the node that is the destination of the packet PD in order to calculate the preamble PA.

Figure 3:
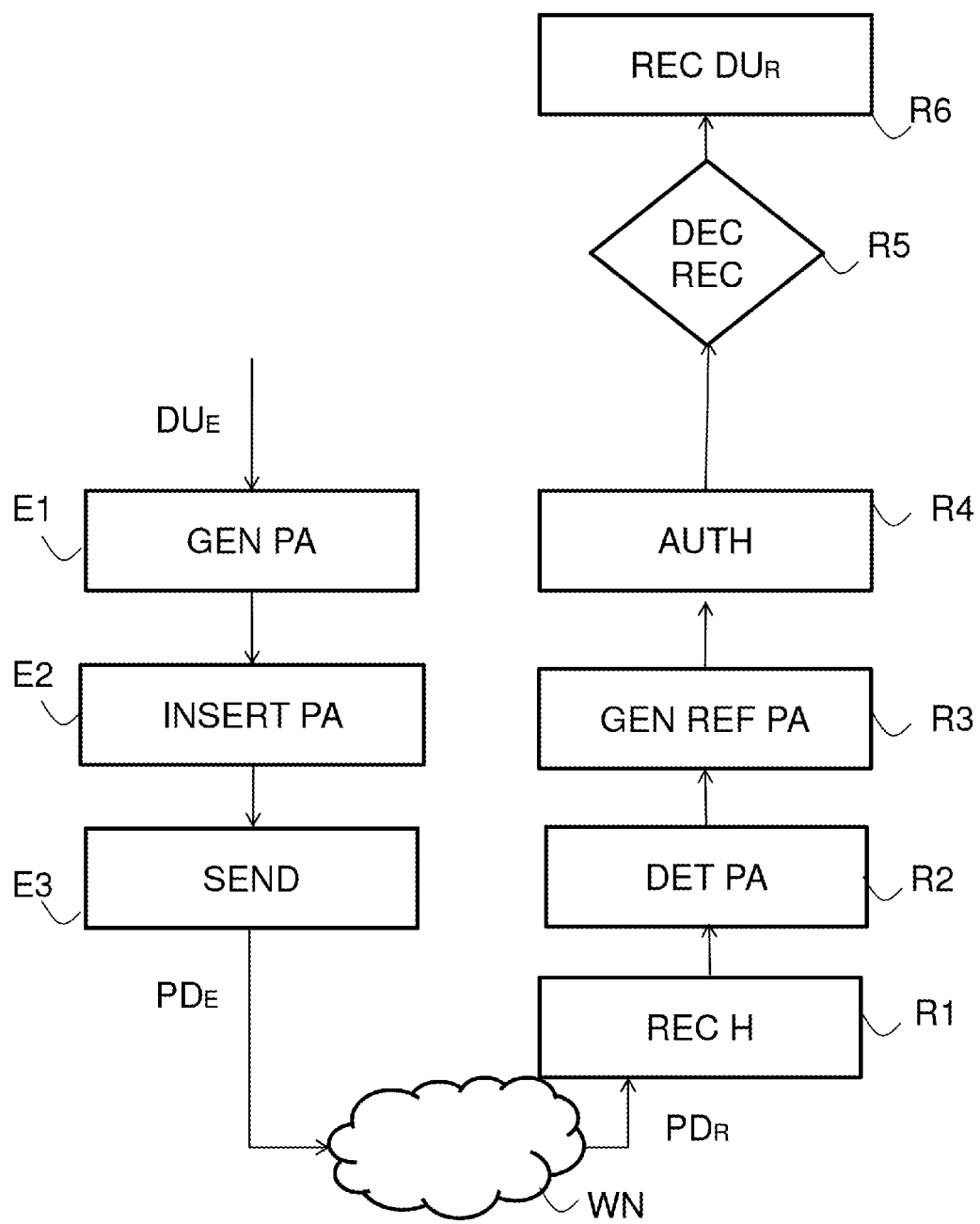
FIG. 3 is a diagram of steps in the method of processing a data packet on transmission and the steps of the method of processing a data packet on reception in accordance with the invention.

The processor device 100 of the invention also has a memory 140 storing a computer program 130 for performing the steps of the transmission processing method of the invention that is described in greater detail with reference to FIG. 3. On initialization, the code instructions of the computer program 130 are loaded for example into a random access memory (RAM) prior to being executed by the processor of the processor unit 120.

In a second aspect of the invention, the node EN also has a device 200 for processing a data packet on reception over a link between another node of the network and the node EN.

The processor device 200 of the invention comprises a receiver module 210 suitable for receiving data transmitted by the radio transceiver module EMR of the node EN coming from other nodes of the network WM. In particular, the receiver module 210 is suitable, in a first state, for ordering the module EMR to receive so-called "control" data contained in the header H of a data packet PD'. The control data H is then processed by a processor unit 220 having a microprocessor suitable for performing the means making up the invention, and in particular means for detecting a link authentication preamble in the header of the data packet to be received, means for authenticating the link by using the detected preamble, and decision-taking means DRP for triggering a second stage of receiving payload data DU' from the transceiver module EMR in the event of the authentication giving a positive result.

The processor device 200 of the invention also has a memory 240 storing a computer program 230 for performing the steps of the reception processing method of the invention, that is described in greater detail with reference to FIG. 3. On initialization, code instructions of the computer program 230 are loaded for example in a RAM prior to being executed by the processor of the processor unit 220.

The processing methods performed by the node EN on transmitting or receiving a data packet in an implementation of the invention are described below with reference to FIG. 3.

Consideration is given initially to the processing method performed by a node EN1 for the purpose of transmitting a data packet $PD_E$ over a link L12 to a second node EN2.

It is assumed initially that the nodes EN1 and EN2 have agreed to share at least one attribute $ATT_{AL}$ relating to authenticating the link L12, an attribute $ATT_{IL}$ relating to identifying the link L12, and an attribute relating to the freshness of the data packet for transmitting over the link L12. It is assumed that these attributes are exchanged in secure and known manner, e.g. when deploying the network. It should be understood that the values of these attributes must not be accessible to other nodes.

In the invention, the attribute $ATT_{AL}$ relating to authentication may for example be a group key such as a network key shared by a group of nodes, or a pair-wise key, such as a key shared by a pair of nodes, or indeed a combination of both types of key.

Concerning the link identification attribute $ATT_{IL}$, it is constituted by information on the basis of which it is possible to verify the identity of the participants in the communication, specifically the identities of the first and second nodes, and above all to distinguish legitimate users from intruders.

The information relating to "freshness", or in other words how up to date the packet is, designates information making it possible to verify that a packet that is a candidate for being received is not a packet that has been retransmitted and that the header has not been copied. By way of example, it may be:

an absolute time stamp for passing through the entire network under consideration (i.e. a "system-wide" time stamp);

a time stamp relative to synchronization of the link; or a packet or frame count specific to the link under consideration.

It may also be valid to use a subset of these attributes as sampled over time. For example, a freshness attribute may be the mean value of one of these attributes over a period of 10 seconds.

During a first step E1, the transmitter node EN1 generates an authentication preamble using the attributes $ATT_{AL}$, $ATT_{IL}$, and $ATT_{P}$.

Below, for reasons of clarity, the transmitter node EN1 is written u and the receiver node EN2 is written v. The node u acts during this first step E1 to generate an authentication preamble AF of length l, where l is a non-zero integer.

The node u is uniquely identified with the help of an identifier IDu and the node v is uniquely identified with the help of an identifier IDv.

In an implementation of the step E1 as described in detail below, the three attributes $ATT_{AL}$, $ATT_{IL}$, and $ATT_{P}$ are selected as follows:

the above-mentioned freshness attribute in this example is a frame count τ of packets that have traveled over the link between the node u and the node v;

the authentication attribute is a secret or a key K(u,v) shared by the pair (u,v); and the identification attribute of the link is formed by concatenating the identifiers IDu and IDv {IDu, IDv}.

In this implementation, the authentication preamble $F_i^{u \rightarrow v}|_{K_{u-v}}$ is generated by the node u for the $i^{th}$ packet transmitted by the node u to the node v on the basis of the above three attributes as follows:

$$F_i^{u \rightarrow v}|_{K_{u-v}} = \begin{cases} H(\{ID_u, ID_v\}, K_{u-v}) & \text{for } i = 0 \\ H(F_{i-1}^{u \rightarrow v}|_{K_{u-v}}, K_{u-v}) & \text{for } i \neq 0 \end{cases} \quad (1)$$

where the variables i, k, and m are non-zero integers.

In equation (1), the function H(k,m) provides a message authentication code (MAC). In known manner, this code enables a receiver to verify that the message it receives has not been altered.

The function may be a function for hashing the data m and the key k, using the variable k that corresponds to the identification attributes of the nodes u and v, and m which corresponds to the authentication attribute of the link.

It can be understood that the authentication preamble is calculated in full for the first packet (i=0) transmitted over the link by the node u to the node v, and that thereafter, from i=1, the value of the authentication preamble as calculated for the preceding packet and the authentication attribute of the link are used as variables for the function H(k,m). In other words, in this example, only the first calculation is directly based on the identity attribute.

A recommended length for the authentication preamble is 32 bits or 64 bits. That gives a good compromise between cost and security.

It should be observed that the cryptographic hashing function H(k,m) may, if necessary, be truncated. For example, it is possible to use a hashing function of the truncated has message authentication code (HMAC) type or indeed a function of the "standard block cipher" type, such as an advance encryption standard (AES) function in the CBC-MAC mode, which is particularly adapted to low power systems on board vehicles since it makes it possible to implement both the encryption and the hashing with a code of minimum size and using a minimum hardware zone. Nevertheless, that is in exchange for reduced efficiency and security.

Concerning truncating the result of applying the hashing function, it should be observed that this can be done in at least three ways:

by eliminating bits from the start;

by eliminating bits from the end; and by sampling using a particular model.

In a step E2, the authentication preamble PA as generated in this way is inserted in the preamble of the data packet $PD_E$ to be transmitted over the link (u,v).

Advantageously, it is inserted as soon as possible in the preamble of the data packet PD, either in the preamble of the physical layer or as early as possible in the preamble of the MAC layer.

In an aspect of the invention, the authentication preamble PA may replace an existing field, such as for example a synchronization word or indeed a frame delimiter. An advantage is that the size of the data packet is not increased.

Alternatively, a new field is inserted in the preamble, e.g. after the synchronization word or the frame count.

The data packet $PD_E$ is then transmitted over the link (u,v), and is then processed by the destination node v. This node performs the method of the invention for processing a data packet on reception, as described below in detail.

During a step R1, in an initial reception stage, the node v receives the header H of the data packet $PD_R$ and detects the authentication preamble PA in step R2.

During a step R4, the node v analyzes the detected authentication preamble by comparing it with a reference authentication preamble that has previously calculated for the link (u,v) in a step R3. To do this, the node v uses the attributes of the link that it shares with the node u.

Returning to the implementation described above in detail, this involves the following three attributes:

the link identification attribute;

the link authentication attribute; and the packet freshness attribute.

The receiver node v has thus calculated the reference authentication preamble $\widehat{(F)}_i^{u \rightarrow v}|_{K_{u-v}}$ in the same manner as the transmitter node u. The node v compares the detected authentication preamble bit by bit with the reference authentication preamble that it has calculated locally. If the two values are identical, then authentication is considered as having succeeded. Otherwise it has failed.

It should be observed that it is particularly advantageous for the node v to precalculate potential values for reference authentication preambles for a certain number of packets that might be transmitted there by its N neighbors, where N is a non-zero integer. This makes it possible to shorten the time required for analyzing a newly received preamble.

Furthermore, in order to avoid any risk of losing synchronization as a result of receiving an erroneous packet, it is recommended to calculate the reference authentication preamble iteratively over a time window W starting from the last packet that has been successfully authenticated. It is thus preferable to select a calculation time window of width smaller than the error rate value on the data packets. Thus, the number of reference authentication preamble values that need to be stored is equal to W·N.

In a step R5, the node v decides whether or not to continue receiving the data packet $PD_R$ as a function of the result of the preceding authentication step.

If authentication was successful, in step R6 it triggers a second stage of receiving the payload data of the data packet, after which it processes the payload data $DU_R$. In contrast, if authentication fails, it stops receiving the data packet and discards it without performing the second stage of reception. As a result, the invention makes it possible to protect the node from the effects of malicious packets, while limiting overhearing.

Figure 4:
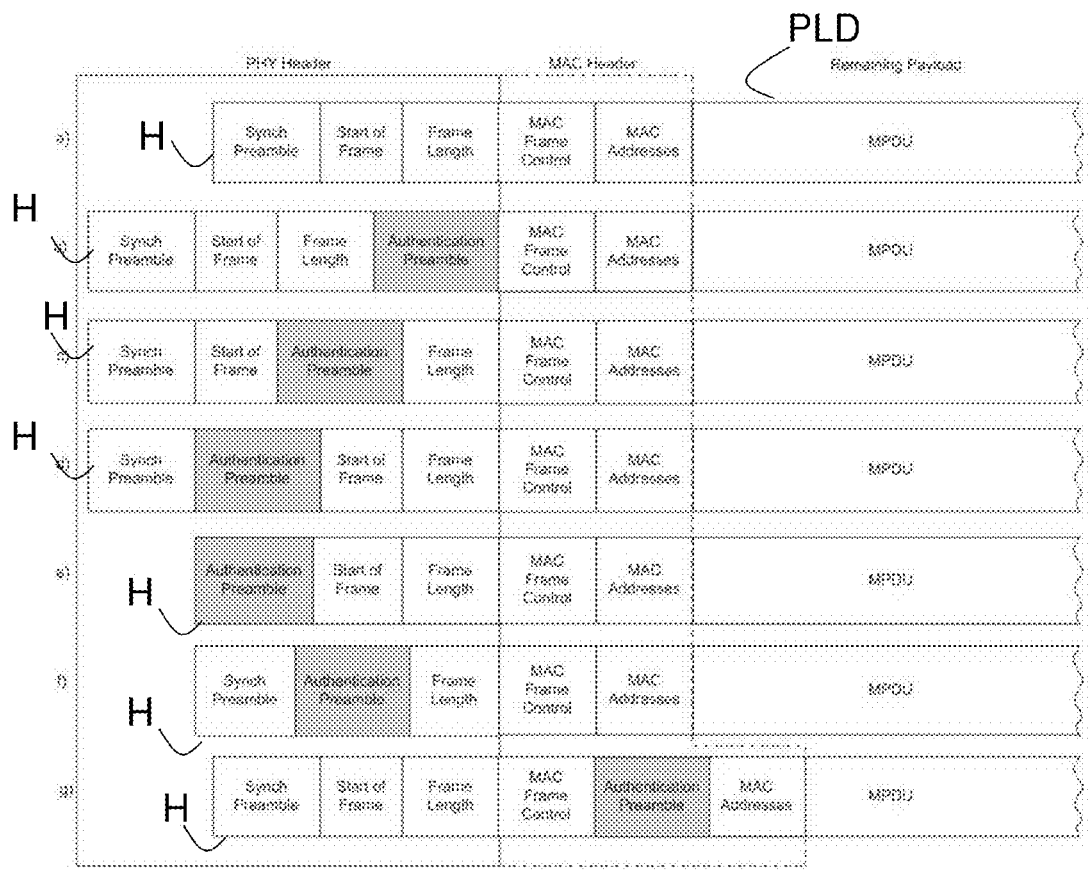
FIG. 4 shows structure elements for a data packet of the invention.

With reference to FIG. 4, there follows a description of various examples of inserting the authentication preamble AP in the invention in the header H of a data packet PD.

FIG. 4 shows an example a) of a conventional structure for a data packet in compliance with the OSI layer model. Such a packet has a header H for control data and a payload portion PLD. The header H comprises a physical layer header PHY-HEADER followed by a MAC layer header MAC-HEADER. The packet also has payload data.

The physical layer header generally has the following three fields:
- a synchronization preamble: synch preamble;
- a start of frame field; and
- a frame length field.

The MAC layer header generally comprises the following two fields:
- a frame control field; and
- an address field.

In a first example b), the authentication preamble AP of the invention is inserted at the end of the physical layer header.

In a second example c), the authentication preamble AP of the invention is inserted in the physical layer header between the start of frame field and the frame length field.

In a third example d), the authentication preamble AP of the invention is inserted in the physical layer header between the synch preamble and the start of frame field.

In a fourth example e), the authentication preamble AP of the invention is inserted in the physical layer header instead of the synch preamble.

In a fifth example f), the authentication preamble AP of the invention is inserted in the physical layer header instead of the start of frame field.

In a sixth example g), the authentication preamble AP of the invention is inserted in the MAC layer header between the frame control field and the address field.

The invention claimed is:

1. A processing method for processing a data packet on reception, said data packet being transmitted by a first node to a second node over a link of a wireless electronic communications network, said packet comprising a header and payload data, wherein said method comprises:
receiving the data packet in two stages, including a first stage of receiving the header, which comprises at least one physical layer header, and a second stage of receiving the payload data, the first stage comprising the following steps performed by the second node on receiving the header of said data packet:
detecting in the received header an authentication preamble for authenticating the link, said detected authentication preamble being inserted in the physical layer header and having a value that is a function of at least one attribute shared by the first and second nodes;
using the data packet authentication preamble to authenticate the link, comprising comparing the detected authentication preamble with a reference authentication preamble generated as a function of said at least one attribute; and
in the event of the authentication having a positive result, as a function of the result of the comparison, deciding to trigger the second stage of receiving the payload data from the data packet.

2. The processing method according to claim 1, wherein the method includes a prior step of generating the reference authentication preamble for the link with the first node on the basis of at least one attribute shared with the first node, and a step of storing said at least one generated reference authentication preamble in a memory device.

3. The processing method according to claim 1, wherein said at least one attribute belongs to the group consisting of:
a link identification attribute;
a link authentication attribute; and
a data packet freshness attribute.

4. The processing method according to claim 3, wherein the step of generating a reference authentication preamble is performed on the basis of an identification attribute {IDu, IDv}, an authentication attribute K(u,v), and a freshness attribute i and on the basis of a message code H(k,m) that is a function of data m and a key k, using the following equation:

$$F_i^{u \to v} |_{K_{u-v}} = \begin{cases} H(\{ID_u, ID_v\}, K_{u-v}) & \text{for } i = 0 \\ H(F_{i-1}^{u \to v} |_{K_{u-v}}, K_{u-v}) & \text{for } i \neq 0 \end{cases}$$

where i, k, and m are non-zero integers.

5. A processing method for processing a data packet for transmission by a first node of a wireless electronic communications network, said data packet having at least one physical layer header and payload data, wherein said method comprises:
inserting a link authentication preamble in the physical layer header of the data packet, by the first node, the link authentication preamble having a value that is a function of at least one attribute shared by the first node and a second node; and
transmitting, by the first node said data packet toward the second node over a link of the wireless electronic communications network.

6. The processing method for processing a data packet according to claim 5, wherein, when the at least one physical layer header is followed by a MAC layer header, the authentication preamble is inserted in the header of the data packet in a position selected from the group consisting of the following positions:
at the end of the physical layer header;
in the physical layer preamble, between an end of frame field and a frame length field;
in the physical layer header, after a synch preamble;
in the physical layer header, instead of the synch preamble; and
in the physical layer header, instead of the start of frame field.

7. A device for processing a data packet on reception, said packet being transmitted by a first node to a second node over a link of a wireless electronic communications network, the packet comprising a header and payload data, wherein the device comprises:
- a receiver configured to receive said packed from the link and comprising a data packet reception module configured to receive the data packet in two stages, including a first stage of receiving the header, which comprises at least one physical layer header, and a second stage of receiving the payload data, said data packed reception module comprising means for use during the first stage of receiving the header of said data packet to perform the following steps:
- detecting in the received header an authentication preamble for authenticating the link, said detected authentication preamble being inserted in the physical layer header and having a value that is a function of at least one attribute shared by the first and second nodes;
- using the data packet authentication preamble to authenticate the link, comprising comparing the detected authentication preamble with a reference authentication preamble generated as a function of said at least one attribute; and
- in the event of the authentication having a positive result, as a function of the result of the comparison, deciding to trigger the second stage of receiving the payload data from the data packet.

8. An apparatus comprising:
a device configured to process a data packet on transmission of said data packet a first node to a second node of a wireless electronic communications network over a link of said network, said data packet comprising at least one physical layer header and payload data, wherein the device comprises:
means for inserting a link authentication preamble in the physical layer header of the data packet, the link authentication preamble having a value that is a function of at least one attribute shared by the first node and the second node.

9. The apparatus of claim 8, further comprising:
the first node of the wireless electronic communications network, the first node comprising the device configured for processing the data packet and a device configured for receiving a data packet from the second node.

10. The apparatus according to claim 9, further comprising the wireless electronic communications network, which comprises the first and second nodes.

11. A non-transitory computer readable medium comprising a computer program stored thereon and having instructions for performing a reception method by a second node of a wireless electronic communications network, when the program is executed by a processor, wherein the method comprises:
- receiving a data packet transmitted by a first node to a second node over a link of the wireless electronic communications network, said packet comprising a header, which comprises at least one physical layer header, and payload data, wherein receiving by the second node comprises:
- receiving the data packet in two stages, including a first stage of receiving the header and a second stage of receiving the payload data, the first stage comprising the following steps performed by the second node on receiving the header of said data packet:
- detecting in the received header an authentication preamble for authenticating the link, said detected authentication preamble being inserted in the physical layer header and having a value that is a function of at least one attribute shared by the first and second nodes;
- using the data packet authentication preamble to authenticate the link, comprising comparing the detected authentication preamble with a reference authentication preamble generated as a function of said at least one attribute; and
- in the event of the authentication having a positive result, as a function of the result of the comparison, deciding to trigger the second stage of receiving the payload data from the data packet.

12. A non-transitory computer readable medium comprising a computer program stored thereon and having instructions for performing a method of transmission of a data packet by a first node of a wireless electronic communications network, when the program is executed by a processor, wherein said data packet comprises at least one physical layer header and payload data, wherein the method comprises:
- inserting, by the first node, a link authentication preamble in the physical layer header of the data packet, the link authentication preamble having a value that is a function of at least one attribute shared by the first node and a second node; and
- transmitting, by the first node, said data packet toward the second node over a link of the wireless electronic communications network.

* * * * *